June 21, 1949.  E. SOKOLIK  2,474,070
SWIVEL FOR ELECTRIC CABLES
Filed Sept. 4, 1945  2 Sheets-Sheet 2
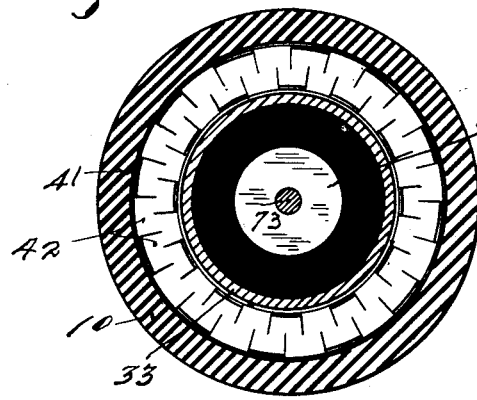
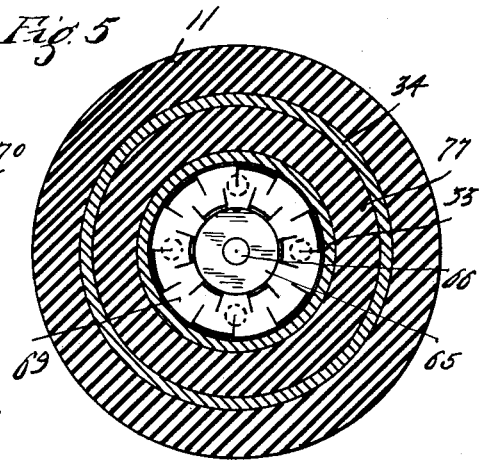
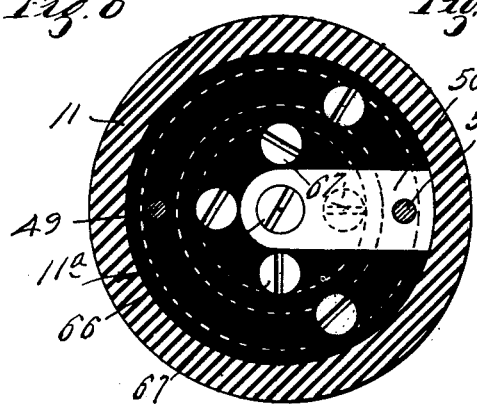
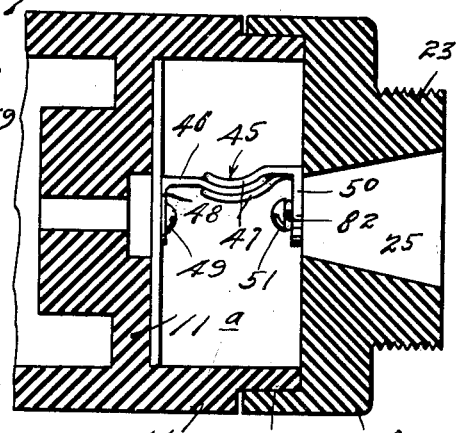
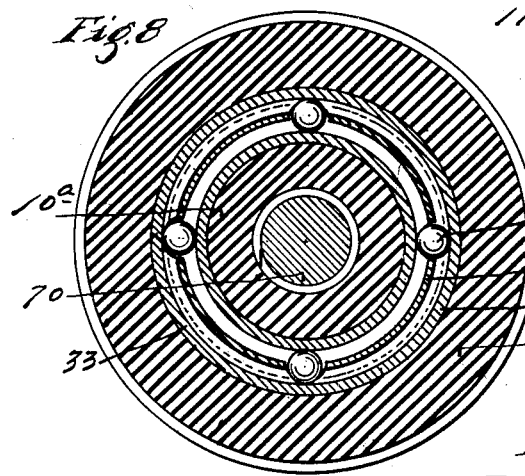
Inventor
Edward Sokolik
By his Attorney
Harry W. Kegon Patented June 21, 1949

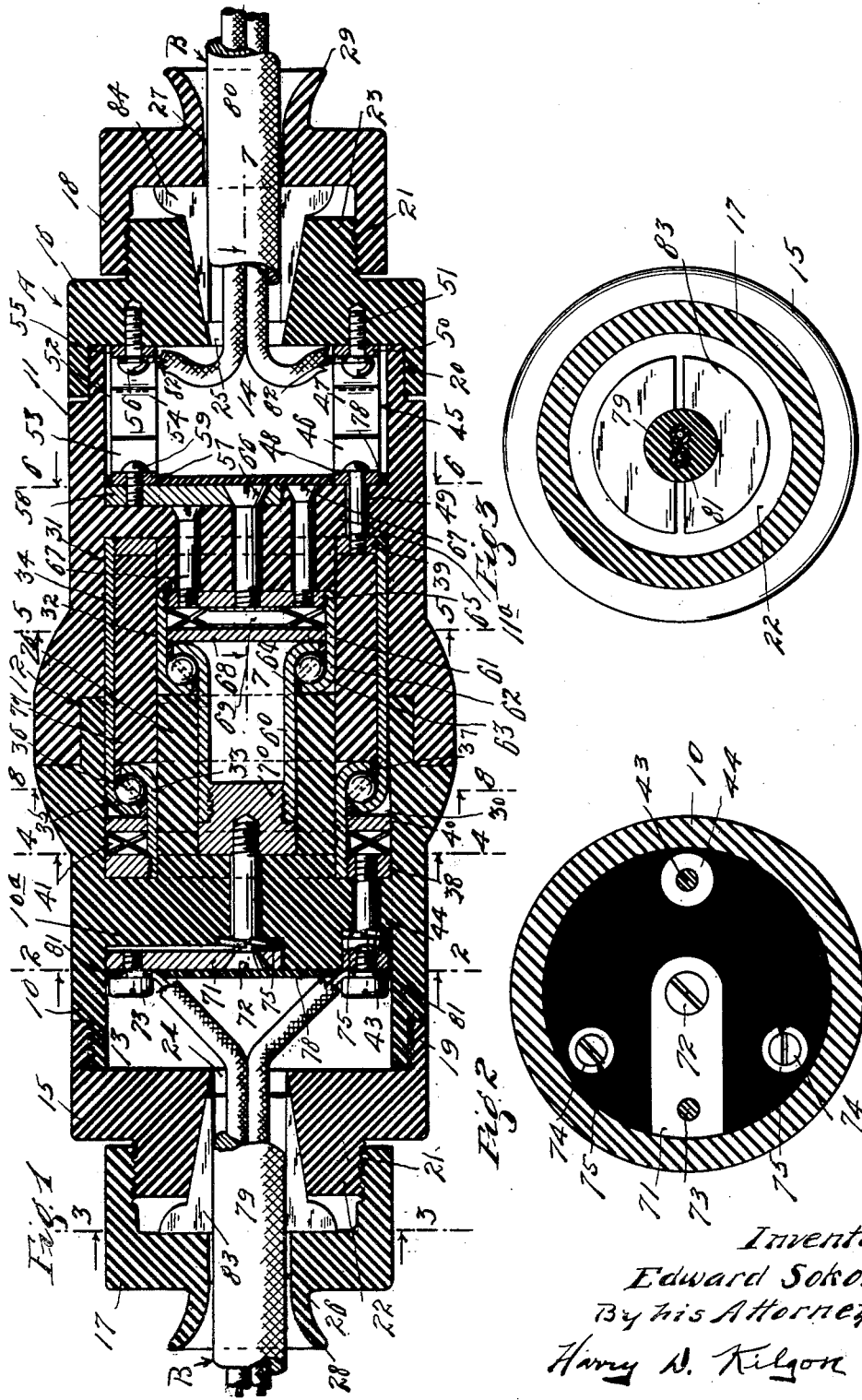

2,474,070

UNITED STATES PATENT OFFICE 2,474,070

SWIVEL FOR ELECTRIC CABLES

Edward Sokolik, New Brighton, Minn.

Application September 4, 1945, Serial No. 614,168

8 Claims. (Cl. 173—324)

My present invention relates to a highly efficient swivel for an electric conducting cable intended for general use, but especially well adapted for use in the electric conducting cables of portable electric machinery and household appliances.

The primary objects of this invention are: first, to eliminate tortion, tortional twists and kinks in electric conducting cables; second, to obviate excessive stress on the terminals for electric conducting cables; third, to prevent short-circuiting and fuse-blowing; fourth, to separately house swivelled electrical conductors relative to their terminals; and fifth, to embody in swivelled electrical conductors, anti-friction devices.

These and other objects of the invention will be apparent from the following description, reference being had to the drawings.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a view in longitudinal central section;

Figs. 2, 3, 4, 5 and 6 are views partly in elevation and partly in section taken on the lines 2—2, 3—3, 4—4, 5—5 and 6—6 of Fig. 1, respectively;

Fig. 7 is a fragmentary detail view principally in section taken on the line 7—7 of Fig. 1;

Figure 8 is a view principally in section taken on the line 8—8 of Figure 1; and Fig. 9 is a view, partly in elevation and partly in section, of one of the anti-friction devices removed from the device.

The letter A indicates, as an entirety, a cylindrical body of suitable insulating material. This body A includes two axially aligned substantially duplicate members 10 and 11. The body members 10 and 11 are connected by a swivel joint 12. Said joint 12 is formed by reversely rabbeting the abutting ends of the body members 10 and 11 and overlapping the same. The body A is increased in external diameter, at the joint 12, to provide sufficient stock for said joint. The body sections 10 and 11 are recessed, at their outer end portions, to afford end compartments 13 and 14, respectively.

The body A also includes primary caps 15 and 16 on the body members 10 and 11, respectively, and secondary caps 17 and 18 on the primary caps 15 and 16, respectively. The primary cap 15 is attached to the outer end portion of the body member 10 by screw-threads 19. The primary cap 16 is attached to the outer end portion of the body member 11 by a slip joint 20. The secondary caps 17 and 18 are detachably secured, by screw-threads 21, to axially aligned bosses 22 and 23, respectively, on the primary caps 15 and 16, respectively, to ease the flexing of cable end-portions.

Formed in the primary caps 15—16 are axial holes 24 and 25, respectively, that are inwardly tapered. Axial holes 26 and 27 are formed in the secondary caps 17 and 18, respectively. Integral with the secondary caps 17 and 18 are outwardly flaring annular mouths 28 and 29, respectively.

Within the body A, midway between the end compartments 13 and 14, is a relatively large central compartment 30. The transverse walls of the body members 10 and 11, that separate the compartment 13 and 14 from the compartment 30, are designated by the numerals 10ᵃ and 11ᵃ, respectively. Swivelled outer and inner concentric electric current conductors 31 and 32, respectively, are mounted in the compartment 30. The outer conductor 31 includes swivelled axially aligned tubular members 33 and 34, respectively, of different diameters. The adjacent end portions of the members 33 and 34 are overlapped and curved, the former outwardly and the latter inwardly to form an annular ball runway 35. The novelty of this tubular swiveled runway 35, wherein a pair of tubular end-portions of different diameters are concentric and annularly curved toward each other, is a full circumferential swiveled hitch joint, the greater the pull of the opposed tubular members the better the connection thereof, a full circumferential swivel bearing, a full circumferential electrical contact and positively non-side shifting swiveled joint, whereby perfect axial alignment is automatically maintained of the tubular members. A plurality of ball bearings preferably are mounted in the runway 35 and h... spaced, on quarters, in a cage 37. This cage 27 is designed expressly for this type of tubular runway 35. The object is to provide a cage that is simple, durable, efficient, and cheap, and at the same time for which the base bearing therefor is inherently provided without especial machining. The cage 37 consists of a conical tube having tubular end-portions, the office of which is to afford a support for the cage 37 and stock between which to form orificial seats for ball bearings 36. The broad tubular end-portion of the cage 37 has an outside diameter corresponding to the inside diameter of the broad member 34 of conductor 31, and is telescopically mounted therein. The slender tubular end-portion of the cage 37 has an inside diameter corresponding to the outside diameter of the member 33 of conductor 31 and is telescopically mounted thereupon.

Surrounding the outer end portion of the member 33 is a ring 38, having flat sides, attached thereto by screw-threads. A ring 39, similar to the ring 38, is fitted in the outer end portion of member 34 and secured thereto by screw-threads. The rings 38 and 39 are seated in annular recesses in the walls 10ª and 11ª, respectively. A loose washer 40 encircling the member 33 bears against the curved inner end of the member 34. A novel annular spring device 41, encircling the member 33, engages the ring 38 as a base of resistance and yieldingly presses the washer 40 against the curved end portion of the member 34. The purpose of the spring device 41 is to keep the walls of the runway 35 in electrical contact with the balls 36. This spring device 41 is a thin flexible orificial disk cut alternately externally and internally on radial lines with the stock between the cuts alternately bent laterally to form a multiplicity of spring fingers 42, see Fig. 4. This novel spring 41 has a circumferentially uniform yielding function up to the thickness of the disk.

A large headed screw 43, that affords a terminal has screw-threaded engagement with the large head of a screw 44 that extends loosely through a hole in the wall 10ª and has screw-threaded engagement with the ring 38. The head of the screw 44 is countersunk in the wall 10ª.

The electric conductor 31 also includes a separable connector 45 in the compartment 14. This connector 45 includes a transversely flat and longitudinally arcuate single contact prong 46 and a co-operating transversely flat and longitudinally arcuate twin contact prong 47 that straddles said single prong. These prongs 46 and 47 are in automatically yieldingly releasable contact engagement. The contact prong 46 has a base 48 that bears on the wall 11ª and is electrically connected to the ring 38 by a screw 49 that extends through a hole in said wall. The twin prong 47 has a base 50 that bears on the primary cap 16 and is secured thereto by a headed screw 51 which also acts as a terminal. The electrical connections just described complete the circuit between the terminals 43 and 51.

The electric conductor 32 includes a separable connector 52, identical with the connector 45 and its single and twin prongs are designated by the numerals 53 and 54, respectively. The base 55 of the twin prong 54 is secured to the primary cap 16 by a headed screw 56 that also affords a terminal. The base 57 of the single prong 53 bears on the contact plate 58 is a recess in the wall 11ª and is electrically secured thereto by a screw 59.

The conductor 32 also includes axially aligned tubular members 60 and 61 that are also axially aligned with the members 33 and 34, a ball runway 62, anti-friction balls 63 and a cage 64 therefor. The members 60 and 61 are identical with the members 33 and 34; the ball runway 62 is identical with the ball runway 35; and the ball 63 and the cage 64 are identical with like parts 36 and 37.

The outer end of the member 61 is closed by a head 65 having screw-threaded engagement therewith. A large screw 66 electrically connects the contact plate 58 to the head 65. This head 65 is clamped onto the wall 11ª by a plurality of screws 67. All of the screws 66 and 67 extend through holes in the wall 11ª. A loose disk 68, within the member 61, bears against the inner end portion of the member 60. A spring device 69, similar to the spring device 41, is compressed between the head 65 and the disk 68 and serves the same purpose as the spring device 41. The outer end of the member 60 is closed by a screw plug 70.

A contact plate 71 similar to the contact plate 58 is mounted in a recess in the wall 10ª within the compartment 13. This contact plate 58 is electrically connected to the plug 70 by a large screw 72 that extends loosely through a hole in the wall 10ª. A large headed screw 73 having threaded engagement with the contact plate 58, at its outer end portion, affords a terminal. In addition to the screw 44, screws 74 loosely extend through holes in the wall 10ª and hold the ring 38 against the wall 10ª. Spring washers 75 are interposed between the heads of the screws 44, 72 and 74. These spring washers 75 permit a slight axial movement of the ring 38, the plug 70 and the members 33 and 60 relative to the members 34 and 61 to secure simultaneous electrical contact therethrough. The member of the conductor 31, just described, completes the electric circuit between the terminals 56 and 73.

The swivelled conductors 31 and 32 are insulated from each other by loose inner and outer tubes 76 and 77, respectively. These tubes 76 and 77 are designed and arranged expressly for this combination. The tube 76 has an inside diameter corresponding to the outside diameter of the tubular member 60 and an outside diameter corresponding to the outside diameter of the tubular member 61, and is telescoped thereupon. The tube 77 has an inside diameter corresponding to the inside diameter of the tubular member 33 and an outside diameter corresponding to the inside diameter of the tubular member 34 and is telescoped thereinto. The tube 76, together with its conductor 32, is telescoped into the tube 77 together with its conductor 31. It will be noted that the flat ring 39 has a width corresponding to the thickness of the tube 77. Insulating material 78 covers the walls 10ª and 11ª in the compartments 13 and 14 insulating the plates 58 and 71, and all other conductor connector elements counter-sunk in the walls 10ª and 11ª excepting terminals 49, 59, 43, and 73 to prevent "shorting" between terminals. The swivelled conductors 31 and 32 permit like swivel movements of the body members 10 and 11. The anti-friction balls 36 and 63 greatly increase the efficiency of the swivel described. All relatively movable parts of the device have free working fit.

A cable B in two sections 79 and 80 has said sections separably connected by my swivel coupling A. The cable section 79 has therein a pair of insulated wires 81 and the cable section 80 has therein a pair of insulated wires 82. The cable section 79 has its inner end portion inserted through the mouth 28, the hole 26 and between a two-part annular wedge-acting clamping member 83 mounted into the tapered hole 24. This clamping member 83 is engaged by the secondary head 17 and by turning said head on the boss 22, said member will be forced into the tapered hole 24 and clamped onto the cable section 79. The inner ends of the wires 81 are bent around the bodies of the screws 43 and 73 and clamped, the one between the heads of the screws 43 and 44 and the other between the head of the screw 73 and the contact plate 71 by forcing the wedges 83 between the respective cables 79 and 80 and the respective primary caps 15 and 16, the said cables are carried inwardly sufficiently to relieve the wire terminals thereof of cable strain as the cables are thus secured to the said caps 15 and 16.

The cable section 80 is attached to the primary cap 16 in the same manner that cable section 79 is attached to the primary cap 15 and the wedge-acting clamping member is designated by the numeral 84. The inner end portions of the wires 82 are bent around the bodies of the screws 51 and 56 and clamped, the one between the head of the screw 51 and base 50 and the other is clamped between the head of the screw 56 and the base 57.

This invention obviously is susceptible to various changes and modifications, without departing from the spirit or scope of the same or sacrificing any of its advantages, and I accordingly include all such variations as my invention.

What I claim is:

1. In an electrical swivel, the combination and arrangement: a body of insulating material having a closed bore in each end and central portion thereof and including a pair of swiveled members; a pair of tubular conductors of different diameters concentric in the central bore, each including a pair of swiveled members of different diameters, at least one member of each conductor being free for slight yielding axial movement to equalize the said conductors for simultaneous electrical contact, one end-portion of the slender member of each conductor being concentric in one end-portion of the broad member of each conductor, the concentric end-portions of the members of each conductor being curved so as to form, together, an annular tubular swiveled runway for ball bearings, the free end of each member of the large conductor being provided with a mounting orificial disk, one of the said disks being disposed in the end of the broad member and the other upon the end of the slender member, respectively, the free end of each member of the small conductor being provided with a mounting head, respectively; securing elements connected to the mounting orificial disks; caged ball bearings in each runway affording a full circumferential bearing and electrical contact and a non-side shifting anti-frictional swiveled joint; a pair of telescoping insulating tubes between the conductors; yielding means operative on the members of each conductor to maintain electrical contact through the ball bearings; compound bolt terminal-connector and terminal-reach-connector assembly in each end bore connecting large and small conductors to conductor elements respectively; the primary bolts of the compound bolts serving to fasten the conductor members and the secondary bolts as terminals; non-conductor plate in each end bore covering connectors interposed between terminals.

2. In an electrical swivel, the combination and arrangement comprising a housing body of insulating material having a closed bore in each end and central portion thereof and including a pair of swiveled members; a pair of tubular conductors concentric in the central bore, each including a pair of swiveled members of different diameters, at least one being yieldingly adapted for slight axial adjustment to assure electrical contact through both conductors, one end-portion of the slender member of each conductor being concentric in one end-portion of the broad member of each conductor, the concentric end-portions of the members of each conductor being curved to form an annular tubular swiveled runway for ball bearings, and the free ends of the respective members of each conductor having means adapted to secure the said members; securing elements connected to said means; a cage for ball bearings in each of the runways; ball bearings in each cage effecting together with said runways a full circumferential bearing and electrical contact and a non-side shifting anti-frictional swiveled joint; yielding means operative on the tubular members of each conductor to maintain electrical contact through the ball bearings; a pair of insulating tubes of different diameters between the conductors; terminals in each end bore electrically connecting tubular conductors to conductor elements; non-conductor plate in each end bore covering conductor elements interposed between terminals.

3. The structure defined in claim 2 in which the corresponding tubular members of the respective tubular conductors are concentric.

4. The structure defined in claim 2 in which each of the cages for ball bearings consists of a conical tube having tubular end-options of different diameters, the large tubular end-portion being disposed between the curved end-portion of the slender tubular member and the inside of the body portion of the broad tubular member; the small tubular end-portion being disposed between the curved end-portion of the broad tubular member and the outside of the body portion of the slender tubular member, said tubular end-portions affording mounting supports for the cages and affording stock between which to form a plurality of radially spaced orificial seats for ball bearings; and in which the yielding means is a spring consisting of a thin flexible disk having an axial orifice and a plurality of radial fingers forming inner and outer margins thereof, said fingers being delineated by slitting the margins radially and alternately, the fingers of each margin being bent in alternate directions, affording a circumferentially uniformly yielding function up to the thickness of the disk.

5. The structure defined in claim 2 in which the broad insulating tube is adapted for telescopic mounting in the broad tubular member of the large conductor and has an inner diameter corresponding to the inner diameter of the slender tubular member; the slender insulating tube is adapted for telescopic mounting upon the slender tubular member of the small conductor and has an outer diameter corresponding to the outer diameter of the broad tubular member; the inside diameter of the broad insulating tube corresponds to the outside diameter of the slender insulating tube, permitting said tubes together with their respective conductors to be telescopically mounted.

6. The structure defined in claim 2, in which the terminals connecting the outer conductor to conductor elements are compound bolt terminals, the primary bolts serving to fasten the conductor members and the secondary bolts serving as terminals, and in which the terminals connecting the inner conductor elements are terminal-reach-connector assemblies, and in which non-conductor plates insulate the opposed terminals from interposed conductor elements.

7. In an electrical swivel, the combination including a pair of concentric tubular conductors of different diameters, each including a pair of axially aligned swiveled tubular members of different diameters, one end-portion of one member being concentric in one end-portion of the other member, said concentric end-portions being curved toward each other to form together an annular tubular runway for ball bearings, caged ball bearings in each of said runways, effecting a full circumferential bearing and electrical contact and a non-side shifting anti-frictional swiveled joint; a pair of telescoping insulating tubes of different diameters, the broad tube being telescoped into the broad member of the outer conductor and having an inside diameter corresponding to the inside diameter of the slender member of the same conductor; the slender tube being telescoped onto the slender member of the inner conductor and having an outside diameter corresponding to the outside diameter of the broad member of the same conductor, the inner tube having an outside diameter corresponding to the inside diameter of the said outer tube and together with its inner conductor being telescoped into the outer tube together with its outer conductor.

8. In an electrical swivel, a pair of tubular conductors of different diameters, one concentric in the other and each including a pair of swiveled members of different diameters; each of the members of the inner conductor being provided on the outer end thereof with a plate having an axial bore for a fastening conductor-connector, the inner end of each member being curved toward the end of the other member to form an annular tubular runway for ball-bearings; each of the members of the outer conductor being provided on the outer end thereof with an orificial plate for fastening conductor-connector; the inner end of each member being curved toward the end of the other member to form an annular tubular runway for ball bearings, such runway effecting a full circumferential bearing, whereby durability of the ball bearings and runway therefor is attained, side shifting of the members obviated and full circumferential electrical contact maintained; a spring cooperating with a washer and having one side bearing against the convex side of at least one of the members of each conductor and the other side against a base of resistance, thus maintaining electrical contact through the ball bearings and runway therefor, the said spring including a thin flat yielding plate having a plurality of radial fingers alternating fingers being bent at an obtuse angle in alternate directions and having a springing coefficiency up to the thickness of the plate, said springing being annularly uniform.

EDWARD SOKOLIK.

REFERENCES CITED

The following references are of record in the file of this patent:

UNITED STATES PATENTS

| Number | Name | Date |
|---|---|---|
| 345,767 | Buckley | July 20, 1886 |
| 446,871 | Lieb | Feb. 24, 1891 |
| 857,024 | Bradshaw | June 18, 1907 |
| 1,174,379 | Bacon | Mar. 7, 1916 |
| 1,178,267 | Scheel | Apr. 4, 1916 |
| 1,311,769 | Ohlsson | July 29, 1919 |
| 1,404,098 | Dennis | Jan. 17, 1922 |
| 1,484,992 | Kijima | Feb. 26, 1924 |
| 1,743,118 | Couture | Jan. 14, 1930 |
| 1,746,159 | March | Feb. 4, 1930 |
| 2,015,590 | Cavanagh | Sept. 24, 1935 |
| 2,119,168 | Kus | May 31, 1938 |
| 2,395,899 | Morrow | Mar. 5, 1946 |